Figures 1, 2:
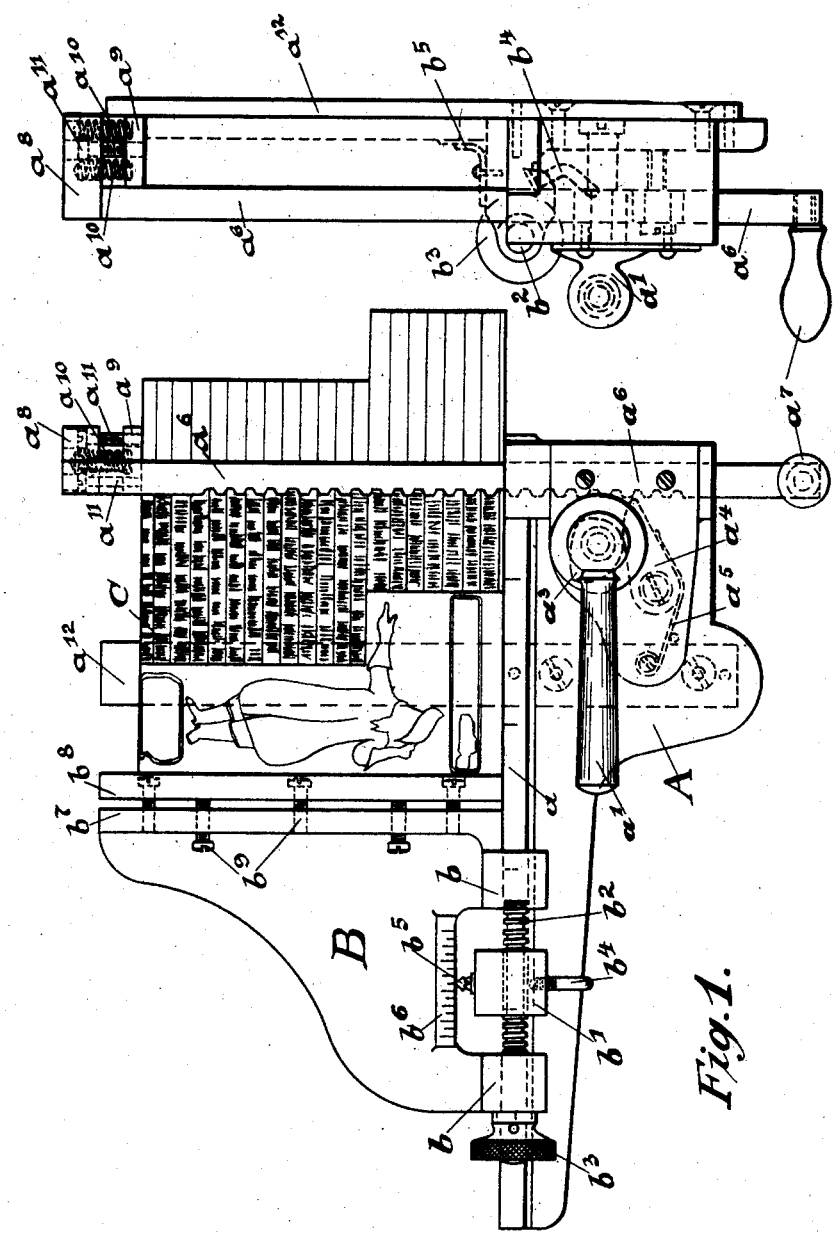

No. 879,348. PATENTED FEB. 18, 1908.
H. WINTER.
DEVICE FOR MEASURING AND CLAMPING PRINTING FORMS.
APPLICATION FILED SEPT. 9, 1905.

Witnesses
Inventor
Herman Winter
By his Attorneys
Redding, Kiddle & Greeley

UNITED STATES PATENT OFFICE.

HERMAN WINTER, OF NEW YORK, N. Y., ASSIGNOR, BY MESNE ASSIGNMENTS, TO F. WESEL MANUFACTURING COMPANY, OF BROOKLYN, NEW YORK, A CORPORATION OF NEW YORK, (INCORPORATED 1906.)

DEVICE FOR MEASURING AND CLAMPING PRINTING-FORMS.

No. 879,348.  Specification of Letters Patent.  Patented Feb. 18, 1908.

Application filed September 9, 1905. Serial No. 277,758.

*To all whom it may concern:*

Be it known that I, HERMAN WINTER, a citizen of the United States, and a resident of the borough of Brooklyn, of the city of New York, in the State of New York, have invented certain new and useful improvements in devices for measuring and clamping printing-forms such as linotype-slugs and the like preparatory to cutting them to size, of which the following is a specification, reference being had to the accompanying drawings, forming a part hereof.

The object of this invention is to provide a simple attachment for a printer's table by means of which printing forms may be measured and held preparatory to cutting them to size. In making up the form for a newspaper column, for instance, it often happens that a block or the like is to be inserted together with linotype slugs which are to be fitted around the block. In such a case, the linotype slugs are previously formed with printing characters over a portion of their length only and are then fitted together around the block and trimmed. By means of the present improvements the block is measured together with the slugs so that the combined block and slugs will fit the column or other portion of the whole form which they are to occupy and are then clamped so that the slugs may be trimmed or cut to the proper size.

The invention is not limited to use in connection with linotype slugs or any other particular printing forms, nor is it limited to the particular use in newspaper work just specified, but may be applied to various kinds of printing forms and to various kinds of uses in the printers' art.

The improvements will be more particularly described in the accompanying drawings in which a convenient and practical embodiment of the same is illustrated, and in which, Figure 1 is a plan view of the device with the printing forms thereon ready to be trimmed, and, Fig. 2 is a view in side elevation looking toward the left in Fig. 1.

The base A, which may be adapted to fit upon a printer's table, has slidable thereon a gage B. For this purpose the base may be provided with a track $a$ around which lugs $b$ upon the gage fit so that the gage is freely movable upon the track. The printing form, which is illustrated in a general way at C, rests against the face of the gage at one side, while another side rests against the base. In the present case this form consists of a block against which linotype slugs are placed, the ends of the slugs, which are devoid of characters, projecting and being in readiness for trimming.

The gage can be set to the desired position by means of a screw $b^2$ which is threaded into one of the lugs $b$ on the gage and into a piece $b'$ slidable upon the track $a$ and provided with means such as a tightening screw $b^4$ to fasten it in any position upon said track. A pointer $b^5$ and a scale $b^6$ is provided, the one upon the piece $b'$ and the other upon the gage B, and by turning the milled head $b^3$ of the screw $b^2$, the gage can be moved in either direction in relation to the piece $b'$ and the distance the gage is moved can be read upon the scale. The face of the gage is preferably made adjustable, this being done in the present case by providing a strip $b^8$ in advance of the face $b^7$ to which it is secured by means of screws $b^9$.

When the form has been adjusted to the proper position by means of the gage and the piece $b'$, it is clamped preparatory to cutting it to size. For this purpose a vise is provided and may comprise a rod $a^6$ adapted to move at right angles to the direction in which the gage moves and thus to clamp the form against the base. At one end of this rod yielding means may be provided to engage the form and, as shown, such means comprise a plate $a^9$ loosely held upon a fixed end piece $a^8$ by screws $a^{11}$, with springs $a^{10}$ interposed between said plate and end piece.

The rod $a^6$ is slidable in the base and means are provided upon the base to tighten the rod against the form. These means may comprise a pawl $a^4$ and a cam $a^3$ adapted to bring the pawl $a^4$ into engagement with a rack or the like, formed upon or secured to the rod $a^6$. Normally the pawl is held away from the rack by a spring $a^5$ and the rod may be freely moved and brought into position with the plate $a^9$ against the form by means of a handle $a^7$ upon the rod. Then by means of a handle $a'$ upon the cam $a^3$ the pawl $a^4$ can be brought into engagement with the rack and by a further movement of the handle the rod will be drawn in toward the base thus clamping the form tightly to the base.

It will be understood that the printer's table, to which the present device is intended to be attached, is provided with a saw for cutting the slugs or other printing forms, although it is possible, as will be obvious, to provide a saw in connection with the present device. When the device is used with a printer's table, however, it may be attached thereto by means of a strip $a^{12}$ which may be provided upon the base, as shown, to fit into a corresponding groove formed in the table. In this way the improved device may be moved back and forth toward and from the saw.

The invention is not limited to the construction herein shown and described as various changes may be made without departing from the spirit of the invention.

I claim as my invention:

1. In a device for holding printing forms such as linotype slugs and the like preparatory to cutting them to size, the combination with a base, of a vise comprising a rod mounted to have a free longitudinal movement upon the base, means upon the rod to engage the forms, means upon the base adapted to engage the rod but normally held from engagement therewith, and a handle operatively connected with said means to effect the engagement of said means and rod to fasten the rod against the forms.

2. In a device for holding printing forms such as linotype slugs and the like preparatory to cutting them to size, the combination with a base, of a vise comprising a rod freely slidable on the base, yielding means at one end of the rod to engage the forms, a rack upon the rod, a pawl upon the base adapted to engage the rack, and a cam upon the base for moving the pawl into engagement with the rack and effecting the clamping of the forms.

This specification signed and witnessed this 8th day of September, 1905.

HERMAN WINTER.

Signed in the presence of—
J. LEWIS NATTER,
LUCIUS E. VARNEY.